United States Patent [19]
Drexhage et al.

[11] 3,743,964
[45] July 3, 1973

[54] Q-SWITCHING SATURABLE ABSORBER DYE FOR A LASER

[75] Inventors: Karl H. Drexhage, Rochester, N.Y.; Ulrich T. Mueller-Westerhoff, Los Gatos, Calif.

[73] Assignee: International Business Machines Corporation, Armonk, N.Y.

[22] Filed: Mar. 20, 1972

[21] Appl. No.: 236,514

Related U.S. Application Data

[63] Continuation of Ser. No. 75,601, Sept. 25, 1970, abandoned.

[52] U.S. Cl............................... 331/94.5, 252/300
[51] Int. Cl............................ H01s 3/11, G02b 5/24
[58] Field of Search..................... 331/94.5; 252/300

[56] References Cited
FOREIGN PATENTS OR APPLICATIONS
1,211,626   3/1966   Germany

OTHER PUBLICATIONS

Schrauzer et al., "Inorganic Chem." 4, (11), Nov., 1965, pp. 1615–17.

Schrauzer et al., "Accounts of Chem. Res.," 2, 1969, pp. 72–80

*Primary Examiner*—Ronald L. Wibert
*Assistant Examiner*—R. J. Webster
*Attorney*—Hanifin and Jancin

[57] ABSTRACT

A Q-switched laser using as the Q-switch a saturable absorber dye from the class of bivalent transition metal ditheine complexes having a square planar structure.

26 Claims, 5 Drawing Figures

PATENTED JUL 3 1973 3,743,964

INVENTORS
KARL H. DREXHAGE
ULRICH T. MUELLER-WESTERHOFF

BY

Thomas F. Galvin

AGENT

Q-SWITCHING SATURABLE ABSORBER DYE FOR A LASER

This is a continuation of application Ser. No. 75,601 filed Sept. 25, 1970 now abandoned.

CROSS-REFERENCE TO A RELATED APPLICATION

This application is related to the application entitled "Eye-Safe Raman Laser" by James T. Vanderslice, filed Sept. 25, 1970, Ser. No. 75,466, now U.S. Pat. No. 3,668,420, and assigned to the same assignee as the present application. In the Vanderslice application, certain species of the present saturable absorber complexes are used to Q-switch a source of 1.06 microns which then stimulates a suitable Raman medium to generate laser radiation at around 1.5 microns.

BACKGROUND OF THE INVENTION

This invention relates to laser Q-switching. More particularly, this invention relates to the use of transition metal dithiene complexes as saturable absorbers for Q-switching lasers.

During the past few years it has become apparent that a Q-switch which consists of a photobleachable dye acting as a saturable absorber offers the most promising means to produce a giant pulse or mode-locked pulses from a laser. As compared with the standard electrical or mechanical means of Q-switching, e.g., Kerr cell, Pockels cell or rotating mirrors, saturable absorbers are automatic. The dye solution automatically responds to an initial stimulated emission of radiation from the laser device to change from an opaque to a transparent condition. Upon becoming transparent, the dye allows the emission of the radiation emanating from the laser in a single pulse of high peak power. After the pulse has been emitted through the solution, the dye reverts to its initial opaque condition. The entire cycle is quite fast, usually occurring in the order of microseconds. In addition to the foregoing advantages, saturable absorbers are self-contained, requiring no external power supplies as are needed with the Kerr cell, or critically aligned mounting means, as are needed with rotating mirrors.

For lasers emitting in the near-infrared, a limited number of compounds are commercially available which have sufficiently strong absorption in this region to be used as Q-switches. Unfortunately, even the best of these dyes suffers from problems which have prevented giant pulse or mode-locked lasers from realizing their full potential.

To be useful as a Q-switch, a compound must have at least the following properties:

1. It must absorb light at the wavelength of the laser material and the decadic molar extinction coefficient at this wavelength must be high. However, the maximum value of the coefficient need not occur at the laser wavelength. On the other hand, the excited states of the compound should not absorb radiation at the wavelength of interest.

2. It must be stable toward irradiation by the laser. Prolonged exposure should not cause molecular rearrangement or decomposition which results in a loss of absorbance.

3. The relaxation time of the compound, defined as the time required to return from the excited to the ground state, should range from $10^{-12}$ to $10^{-8}$ sec. If the relaxation time is too fast, some of the molecules will return to the ground state too quickly, with the result that the compound will never become completely transparent. If the relaxation time is too long, the compound is not useful for mode-locking.

The principal drawback when using present Q-switch dyes is their instability toward irradiation by laser light or ambient light. The dyes tend to degrade rapidly after the first few pulses are produced. In some dyes that are sold commercially, the active chemical breaks down completely after five or six pulses. It is generally appreciated in this field that compounds of the class of cyanine dyes, which comprise most of the commercially available saturable absorbers, exhibit this undesirable characteristic. This problem restricts the dye to laboratory use or to circumstances where replacement is easily accomplished. For continuous use as well as for applications outside of the laboratory in field operations, which would be numerous, existing saturable absorbers are inadequate.

A second drawback with present saturable absorbers appears when they are used in giant-pulse lasers. In this area, the energy of each pulse is important and many dyes fail to produce a pulse which has sufficient energy to be useful.

It is therefore an object of this invention to provide an improved Q-switched laser.

It is another object of this invention to provide a saturable absorber dye as a Q-switch in a laser which can be reused a large number of times with virtually no permanent bleaching.

It is another object of this invention to produce giant laser pulses with high power when using a saturable absorber dye as a Q-switch in a giant pulse laser.

These and other objects are achieved by the use of compounds of the class of bivalent transition metal dithiene complexes having a square planar structure as saturable absorbers in a Q-switched laser.

The square planar dithiene complex has the general formula [Me $S_4C_4$ $(R_4)$]° where Me is a bivalent transition metal and R is hydrogen, alkyl, aryl, substituted aryl or a heterocyclic system. The structure shown in (I) below represents these complexes:

(I) 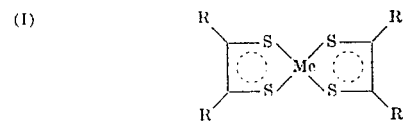

The metal dithienes form a group of compounds whose properties are strongly determined by the nature of both the central metal and the ligands. Their extreme stability is predominately determined by the chelate rings and is not greatly affected by the choice of R substituents. A survey of metal dithiene complexes is given by J. A. McCleverty in *Progress in Inorganic Chemistry*, Vol. 10, Ch. 2 (F. A. Cotton, Ed.).

It has been discovered that dithiene complexes of bivalent transition metals exhibit the required properties of a saturable absorber and that they have a remarkably high photochemical stability. They have been found to be especially useful as Q-switches for lasers which emit radiation ranging from around 0.7 microns to around 1.2 microns, e.g., ruby which emits at 0.6943 microns and $Nd^{+3}$-glass which emits at 1.06 microns. This feature is particularly important with respect to $Nd^{+3}$-glass because only a very limited number of presently known dyes show sufficient absorption in the infrared region of the spectrum to Q-switch a $Nd^{+3}$-glass laser. In addition most of the known dyes decompose quickly when exposed either to laser radiation or to background radiation.

Particular examples of the dyes of the present invention which have exhibited the above characteristics will be more specifically detailed below.

The dithiene complexes described are known in the art and they are not, in themselves, inventive.

A general method of preparing this class of complexes is described in the article, "Concerning the Synthesis of Dithio-α-diketone Complexes of Transition Metals from Thiophosphates of 1, 2 Dithiols, " *Inorganic Chemistry*, Schrauzer, et al., Vol. 4, No. 11, Nov. 1965, pp. 1615–1617.

It is preferred to prepare the complex bis-[4-dimethylaminodithiobenzil]-nickel as follows: To a solution of 15 g. 4-dimethylaminobenzoin in 200 ml dioxane, 25 g. of $P_4S_{10}$ were added, and the mixture was heated to reflux. After a few minutes of heating, a clear, red solution was formed, which was refluxed for an additional 15 minutes. On cooling, the intermediate ester of thiophosphoric acid separated as a viscous mass which quickly solidified. The supernatant solution, which contained only small amounts of this intermediate, was decanted. The solid residue was heated on a steam bath with a solution of 15 g $NiCl_2 \cdot 6H_2O$ in 50 ml water and 100 ml conc. HCl. With foaming and evolution of $H_2S$, a deep green solution was formed, which contained the doubly protonated complex. Addition of 200 ml water precipitated a red intermediate in non-crystalline form, which was separated from the supernatant liquid and heated with Methanol to form red crystals of m.p. 282°C. Heating this complex with 200 ml benzene and 100 ml 6N NaOH produced a deep green benzene solution from which the free complex was obtained by evaporation of the solvent and addition of petroleum ether. Further purification is best achieved by column chromatography on silica gel with benzene as the eluent. The black crystals of the pure complex melt at 277°–278° C.

Analysis calcd. for $C_{32}H_{30}N_2S_4Ni$: C, 61.1%; H, 4.48%; Found: C, 61.43%; H, 4.90%.

The other complexes described below have been prepared using the same techniques with appropriate metal salts. Other methods of preparation will occur to those of skill in the art and no claim is made to the particular method for making the dye described above.

The invention will be more fully understood by referring to the following detailed description taken in connection with the accompanying drawings, forming a part thereof, in which.

Figure 1:
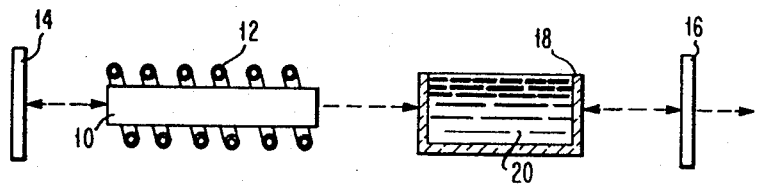
FIG. 1 is a schematic diagram of a Q-switched laser employing the saturable absorber dye of the present invention.

Referring now to FIG. 1, there is shown a schematic diagram of a Q-switched laser system. The system shown is standard in the art; the sole inventive feature lies in using the saturable absorber dye as the Q-switch. Laser crystal 10 is an active medium which will emit coherent radiation when pumped by flash lamp 12. In the examples described below, crystal 10 is either ruby, which is formed of aluminum oxide doped with chromium, or neodymium-glass ($Nd^{+3}$-glass). It will be understood that other active media may also be utilized; however, ruby and $Nd^{+3}$-glass are by far the most useful media in present Q-switched lasers. Reflector 14 reflects substantially all of the radiation emitted from crystal 10 and is preferably 100 percent reflective. Reflector 16 is selected to be partially transmissive to radiation emitted from crystal 10. The degree of transmissivity selected depends on the length of the laser cavity formed by reflectors 14 and 16, on the power output desired from the system and on other factors well known to those of skill in the art. Disposed between reflector 16 and crystal 10 is a glass cell 18 which houses the dye compound 20 of the present invention dissolved in a solution which is transmissive at the particular laser wavelength desired. In the examples to be described, the solution is 1, 2 dichloroethane. Other solutions are also effective, such as benzene or methylene chloride. The choice will be dependent on the particular wavelength it is desired to Q-switch. In addition, the dye might be imbedded in a plastic, such as methyl methacrylate or polystyrene. It will be understood that the vertical walls of cell 18 may be optionally coated with anti-reflection coatings which are chosen to transmit substantially all of the radiation emitted by crystal 10.

EXAMPLES 1 AND 2

Compounds having the general formula shown in Formula (I) above are used to Q-switch a ruby rod at 0.6943 microns. In the system illustrated in FIG. 1, laser crystal 10 is a ruby rod which is three-eighths inch in diameter and 4 inches in length. Mirror 16 is 100 percent reflective and output mirror 14 is a resonant reflector. The cavity length between reflectors 14 and 16 is one foot.

EXAMPLE 1

The complex in this example is bis-[dithiodiacetyl]-platinum. The complex has the general formula described in (I), where Me is platinum and R is $CH_3$.

EXAMPLE 2

The complex is bis-[dithiodiacetyl]-nickel. The complex has the general formula described in (I), where Me is nickel and R is $CH_3$.

Figure 2:
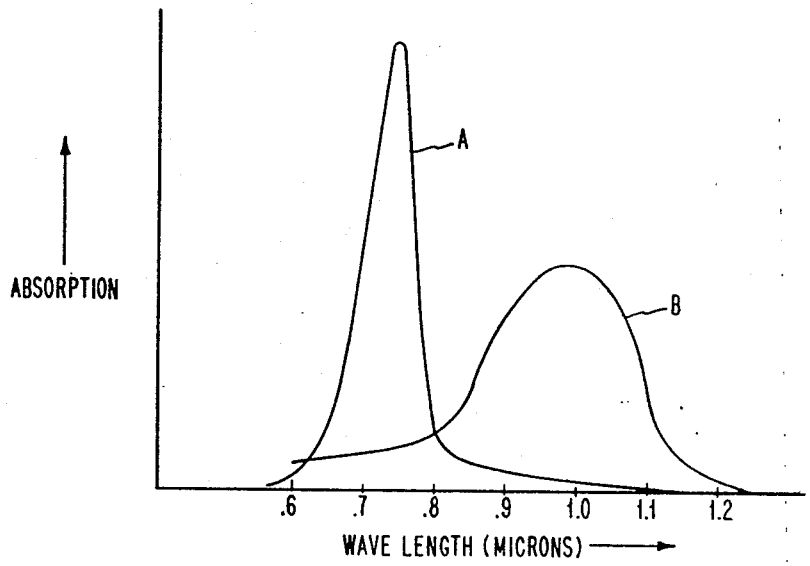
FIGS. 2A and 2B are showings, respectively, of the absorptivity characteristics of the dithiene complexes bis-[dithiodiacetyl]-platinum and bis-[4-dimethylaminodithiobenzil]-nickel dissolved in 1,2 dichloroethane.

FIG. 2A is a graph of absorption vs. wavelength of the complex bis-[dithiodiacetyl]-platinum (Example 1). The concentration (c) of the complex is $2 \times 10^{-5}$ molar in a solution of dichloroethane. The absorption length (l) of cell 18 is 1 cm. It may be seen from the graph that the maximum intensity occurs around 0.7350 microns. The extinction coefficient ($\epsilon$) at 0.6943 microns is $1.42 \times 10^4$, which is calculated using the equation:

$$I/I_o = 10^{-\epsilon c l}$$

where
I is the light transmitted through the cell; $I_o$ is the incident light; $c$ is the concentration of the dye in solution; and $l$ is the absorption length of the cell.

Figure 3:
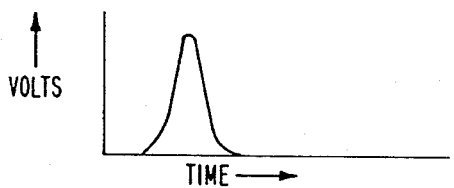
FIG. 3 is a temporal profile of the characteristics of the output pulse of a giant pulse laser produced when using bis-[dithiodiacetyl]-platinum as the saturable absorber dye.

FIG. 3 is a graphical representation of an oscilloscope pattern of the output voltage vs. time of a pulse Q-switched by the complex bis-[dithiodiacetyl]-platinum of Example 1. The input energy from the light pump 12 is 860 joules. The laser output is about 0.75 joules with a 10 nanosecond full width at half the maximum (FWHM) duration. The pulse exhibits no multiple spikes. The durability of the dye over a long period of time is very good. The wavelength of the emitted light is observed to remain at 0.6943 microns with a Jarrel-Ash spectrometer. Similar tests for bis-[dithiodiacetyl]-nickel (Example 2) indicate an extinction coefficient ($\epsilon$) at 0.6943 microns of $0.398 \times 10^4$. For an input energy from source 12 of 860 joules, the output energy is 0.4 joules.

The energy output difference between the complexes in Examples 1 and 2 is attributable to the differences in their extinction coefficients.

EXAMPLES 3-7

Transition metal-dithiene complexes having the following general formula may be used to Q-switch radiation at 1.06 microns from a $Nd^{+3}$-glass rod:

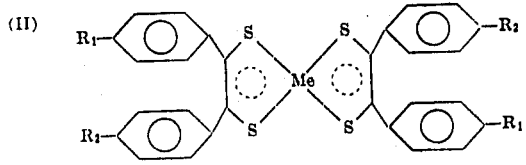

(II)

EXAMPLE 3

The saturable absorber dye is bis-[dithiobenzil]-nickel, where, in the structure shown in (II), $R_1$ and $R_2$ are hydrogen atoms and Me is nickel.

EXAMPLE 4

The saturable absorber dye is bis-[dithiobenzil]-platinum, where, in the structure shown in (II), $R_1$ and $R_2$ are hydrogen atoms, and Me is platinum.

EXAMPLE 5

The saturable absorber dye 18 is bis-[4,4'-dimethoxydithiobenzil]-nickel, where $R_1$ and $R_2$ are $CH_3O$, and Me is nickel.

EXAMPLE 6

The saturable absorber dye 18 is bis-[4,4'-dimethoxydithiobenzil]-platinum where $R_1$ and $R_2$ are $CH_3O$ and Me is platinum.

EXAMPLE 7

The saturable absorber dye 18 is bis-[4-dimethylaminodithiobenzil]-nickel where $R_1$ is hydrogen, $R_2$ is $(CH_3)_2 N$ and Me is nickel.

FIG. 2B is a graph of absorption vs. wavelength of the complex bis-[4-dimethylaminodithiobenzil]-nickel (Example 7). The concentration of the complex was $0.167 \times 10^{-4}$ molar in a solution of dichloroethane. It can be seen from the graph that the maximum intensity occurs around 1.0 microns.

The extinction coefficient ($\epsilon$) at 1.06 microns is $2.5 \times 10^4$. This value of extinction coefficient ($\epsilon$) is far in excess of the minimum value required to achieve Q-switching. The broad absorption spectrum indicates that Q-switching may be achieved for lasers radiating at other wavelengths around 1 micron.

Figure 4:
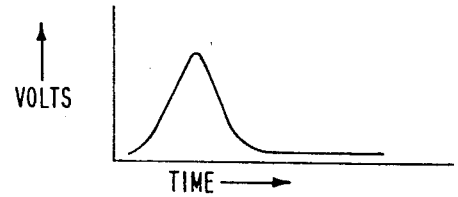
FIG. 4 is a temporal profile of the characteristics of the output pulse of a giant pulse laser produced when using bis-]4-dimethylaminodithiobenzil]-nickel as the saturable absorber dye.

FIG. 4 is a graphical representation of an oscilloscope pattern of the output voltage versus time of a high-speed photograph of a typical output pulse produced by the system using the complex bis-[4-dimethylaminodithiobenzil]-nickel of Example 7. The dye solution is adjusted to pass about 56 percent of the light at 1.06 microns. The laser output is about 1.2 joules in 20 nanoseconds for a typical input energy from pump source 12 of 3,500 joules and there are no multiple spikes in the output light.

Referring again to FIG. 1, the laser system used in this example comprises the following: laser crystal 10 is a normal-end $Nd^{+3}$-glass rod one-half inch in diameter and 6 inches long. Output mirror 16 is 60 percent reflecting and reflector 14 is 100 percent reflecting to radiation at 1.06 microns, which is emitted by crystal 10. The cavity length between mirrors 16 and 14 is 1.5 feet.

Durability tests taken on the above system extended for a period of 9 days with the cell constantly exposed to radiation of wavelength 1.06 microns and an energy of 4,000 joules. In addition, the cell containing the dye was neither shielded from the flash light pump or room light. Over 500 readings were taken during this period without changing the Q-switch solution. The excellence of this system is indicated by the fact that only five of the pictures showed double Q-switched pulses, the five being randomly distributed throughout the tests. The typical laser output energy during these tests is about 1.7 joules in 20 nanoseconds, which corresponds to a peak power of 85 MW. These results were obtained at a temperature of 25°C. Satisfactory Q-switching occurred with no change of wavelength at temperatures ranging from slightly below the boiling point of the dichloroethane solvent to its freezing point.

EXAMPLE 8

The saturable absorber dye complex bis-[4-dimethylaminodithiobenzil]-nickel (Example 7) is used to provide mode-locked laser pulses. Referring again to the system illustrated in FIG. 1, the laser crystal 10 is $Nd^{+3}$-glass. Mirror 12 is 65 percent reflective at 1.06 microns and the separation between mirrors 12 and 14 is approximately 3 feet. The dye concentration is adjusted to pass about 75 percent of the 1.06 micron radiation. The pumping energy from flashlamp 12 is set at 4,400 joules and the typical output energy varies between 0.1 and 0.2 joules, with the envelope of the mode-locked pulse train extending over 50 nanoseconds. This system was tested for 2 days without changing the dye solution and no evidence of dye deterioration was observed.

Figure 5:
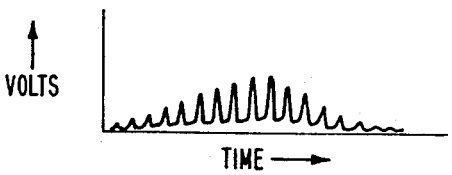
FIG. 5 is a temporal profile of a series of mode-locked pulses produced by the laser system of FIG. 1 when using bis-[4-dimethylaminodithiobenzil]-nickel as the saturable absorber dye.

FIG. 5 shows a graphical representation of an oscilloscope pattern of a mode-locked pulse from the Q-switched laser. The separation between the successive mode-locked pulses corresponds to the round-trip time of the light pulse inside the cavity. Modulation is less than 100 percent. This is due to the relatively long relaxation time of this particular complex in the order of nanoseconds. The apparent cause is the presence of the "heavy" sulfur and nickel atoms which generally enhance singlet to triplet intersystem crossing.

The critical feature of the dithiene complexes of the present invention is the central ring: $[MeC_4S_4]$. The previously noted stability of this ring is predominately determined by the chelate rings and is not greatly affected by the choice of R substituents. In addition, the ability to serve as a saturable absorber is due to the square planar structure. Experiments with a dithiene complex having a trigonal prismatic structure, rather than square planar, indicate that the trigonal structure is not suitable as a saturable absorber. For instance, the trigonal prismatic complex:

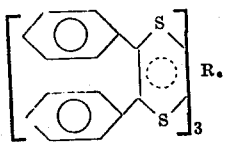

failed to yield a useful laser output even though its extinction coefficient ($\epsilon$) was measured to be $2.8 \times 10^4$. This is much higher than the extinction measured for some successful saturable absorbers. Notwithstanding the high value of $\epsilon$, the complex yielded a negligible laser output and it was not possible to obtain a single Q-switched pulse.

The absorption characteristics of the square planar dithiene complexes vary according to both the central metal as well as the substituents. For example, the spectrum of the unsubstituted complex:

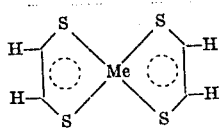

is determined by the central metal. However, the position of the absorption band in substituted complexes greatly depends on the nature of the ring and on its size. Hence, the choice of various substituents on the phenyl rings (examples 3-7) or of aromatic rings other than phenyl as substituents allows the preparation of compounds with different central metals but similar absorption spectra.

While the invention has been particularly shown and described with reference to a preferred embodiment thereof, it will be understood by those skilled in the art that various changes in form and detail may be made therein without departing from the spirit of the invention. For instance, the values of the parameters of the laser system of FIG. 1, e.g., cavity length, absorber dye transmissivity, etc., may be varied to achieve useful output pulses having different characteristics from those described.

What is claimed is:

1. In a passively Q-switched laser utilizing a saturable absorber as the passive Q-switch, the improvement wherein the saturable absorber is a bivalent transition metal dithiene complex with a square planar structure.
2. A laser as in claim 1 wherein the transition metal is selected from the group consisting of nickel and platinum.
3. A laser as in claim 1 wherein the dithiene complex is bis-[dithiodiacetyl]-platinum.
4. A laser as in claim 1, wherein the dithiene complex is bis-[dithiodiacetyl]-nickel.
5. A laser as in claim 1, wherein the dithiene complex is bis-[dithiobenzil]-nickel.
6. A laser as in claim 1, wherein the dithiene complex is bis-[dithiobenzil]-platinum.
7. A laser as in claim 1, wherein the dithiene complex is bis-[4,4'-dimethoxydithiobenzil]-nickel.
8. A laser as in claim 1, wherein the dithiene complex is bis-[4,4'-dimethoxydithiobenzil]-platinum.
9. A laser as in claim 1, wherein the dithiene complex is bis-[4-dimethylaminodithiobenzil]-nickel.
10. In a passively Q-switched laser utilizing a saturable absorber as the passive Q-switch, the improvement wherein the saturable absorber has the following general formula:

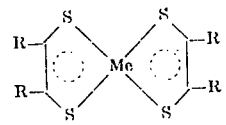

wherein R is a substituent selected from the group consisting of an alkyl group, an aryl group, a substituted aryl group, a heterocyclic system and a hydrogen atom, and Me represents a bivalent transition metal.

11. In a passively Q-switched laser for producing laser pulses having a wavelength of 1.06 microns, utilizing a saturable absorber as the passive Q-switch and Neodymium-glass as the active medium, the improvement wherein the saturable absorber has the following general formula:

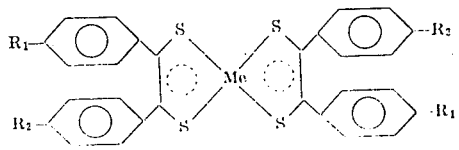

wherein $R_1$ represents a hydrogen atom, $R_2$ is a substituent selected from the group consisting of a hydrogen atom and $(CH_3)_2N$, and Me is a bivalent transition metal selected from the group consisting of nickel and platinum.

12. In a passively Q-switched laser for producing laser pulses having a wavelength of 1.06 microns, utilizing a saturable absorber as the passive Q-switch and Neodymium-glass as the active medium, the improvement wherein the saturable absorber has the following general formula:

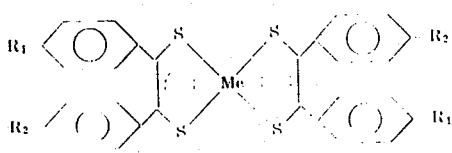

wherein $R_1$ and $R_2$ represent $CH_3O$ and Me is a bivalent transition metal selected from the group consisting of nickel and platinum.

13. In a passively Q-switched laser for producing laser pulses having a wavelength of 0.6943 microns, utilizing a saturable absorber as the passive Q-switch and ruby as the active medium, the improvement wherein the saturable absorber has the following general formula:

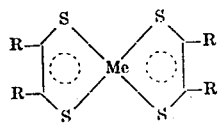

wherein R represents $CH_3$ and Me is a bivalent transition metal selected from the group consisting of nickel and platinum.

14. A method for providing Q-switched pulses from a laser oscillator comprising:
   transmitting the intracavity laser radiation through an intracavity saturable absorber which comprises a bivalent transition metal dithiene complex with a square planar structure.

15. A method as in claim 1 wherein the transition metal is selected from the group consisting of nickel and platinum.

16. A method as in claim 1 wherein the dithiene complex is bis-[dithiodiacetyl]-platinum.

17. A method as in claim 1 wherein the dithiene complex is bis-[dithiodiacetyl]-nickel.

18. A method as in claim 1 wherein the dithiene complex is bis-[dithiobenzil]-nickel.

19. A method as in claim 1 wherein the dithiene complex is bis-[dithiobenzil]-platinum.

20. A method as in claim 1 wherein the dithiene complex is bis-[4,4'-dimethoxydithiobenzil]-nickel.

21. A method as in claim 1 wherein the dithiene complex is bis-[4,4'-dimethoxydithiobenzil]-platinum.

22. A method as in claim 1 wherein the dithiene complex is bis-[4-dimethylaminodithiobenzil]-nickel.

23. A method for producing Q-switched pulses from a laser comprising:
   transmitting the laser radiation through a saturable absorber which has the following general formula:

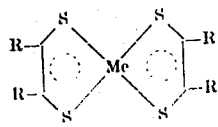

wherein R is a substituent selected from the group consisting of an alkyl group, an aryl group, a substituted aryl group, a heterocyclic system and a hydrogen atom, and Me represents a bivalent transition metal.

24. A method for producing Q-switched laser pulses having a wavelength of 1.06 microns from a Neodymium-glass laser comprising:
   transmitting the laser radiation through a saturable absorber which has the following general formula:

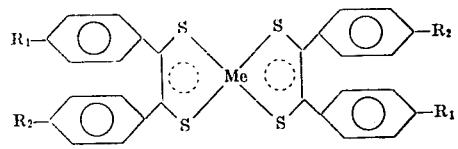

wherein $R_1$ represents a hydrogen atom, $R_2$ is a substituent selected from the group consisting of a hydrogen atom and $(CH_3)_2N$, and Me is a bivalent transition metal selected from the group consisting of nickel and platinum.

25. A method for producing Q-switched laser pulses having a wavelength of 1.06 microns from a Neodymium-glass laser comprising:
   transmitting the laser radiation through a saturable absorber which has the following general formula:

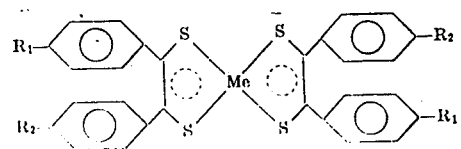

wherein $R_1$ and $R_2$ represent $CH_3O$ and Me is a bivalent transition metal selected from the group consisting of nickel and platinum.

26. A method for producing Q-switched laser pulses having a wavelength of 0.6943 microns from a ruby laser comprising:
   transmitting the laser radiation through a saturable absorber which has the following general formula:

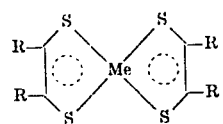

wherein R represents $CH_3$ and Me is a bivalent transition metal selected from the group consisting of nickel and platinum.

* * * * *

PO-1050
(5/69)

UNITED STATES PATENT OFFICE
CERTIFICATE OF CORRECTION

Patent No. 3,743,964          Dated July 3, 1973

Inventor(s) Karl H. Drexhage and Ulrich T. Mueller-Westerhoff

It is certified that error appears in the above-identified patent and that said Letters Patent are hereby corrected as shown below:

Column 9, line 38, change "claim 1" to --claim 14--;

Column 9, line 41, change "claim 1" to --claim 14--;

Column 9, line 43, change "claim 1" to --claim 14--;

Column 9, line 45, change "claim 1" to --claim 14--;

Column 9, line 47, change "claim 1" to --claim 14--;

Column 9, line 49, change "claim 1" to --claim 14--;

Column 9, line 51, change "claim 1" to --claim 14--;

Column 9, line 53, change "claim 1" to --claim 14--.

Signed and sealed this 8th day of October 1974.

(SEAL)
Attest:

McCOY M. GIBSON JR.
Attesting Officer

C. MARSHALL DANN
Commissioner of Patents